(12) United States Patent
Sommer et al.

(10) Patent No.: US 9,493,142 B2
(45) Date of Patent: Nov. 15, 2016

(54) LINK

(71) Applicants: Frank Sommer, Balingen (DE);
Andreas Massold, Balingen (DE)

(72) Inventors: Frank Sommer, Balingen (DE);
Andreas Massold, Balingen (DE)

(*) Notice: Subject to any disclaimer, the term of this patent is extended or adjusted under 35 U.S.C. 154(b) by 78 days.

(21) Appl. No.: 14/451,682

(22) Filed: Aug. 5, 2014

(65) Prior Publication Data
US 2015/0059127 A1 Mar. 5, 2015

(30) Foreign Application Priority Data

Sep. 3, 2013 (EP) .................................... 13004317

(51) Int. Cl.
| | | |
|---|---|---|
| *E05D 15/06* | (2006.01) | |
| *E05D 5/00* | (2006.01) | |
| *B60S 1/50* | (2006.01) | |
| *E05D 3/02* | (2006.01) | |
| *E05D 3/12* | (2006.01) | |
| *B29C 45/00* | (2006.01) | |
| *B29L 31/22* | (2006.01) | |

(52) U.S. Cl.
CPC ............ *B60S 1/50* (2013.01); *B29C 45/0017* (2013.01); *E05D 3/02* (2013.01); *E05D 3/022* (2013.01); *E05D 3/125* (2013.01); *B29L 2031/22* (2013.01); *Y10T 16/52* (2015.01); *Y10T 16/555* (2015.01); *Y10T 16/557* (2015.01)

(58) Field of Classification Search
CPC ............ Y10T 16/525; Y10T 16/5361; Y10T 16/53613; Y10T 16/5362; Y10T 16/544; Y10T 16/5445; Y10T 16/5448; Y10T 16/555; Y10T 16/557; B29C 45/0017; B29L 2031/22; B29L 2031/56; B29L 2031/565; B60S 1/50; B65D 2543/00; B65D 2543/00009; B65D 2543/00018; B65D 2543/00293; B65D 43/162; B65D 43/164; B65D 43/169; B65D 43/166; E60D 47/0885; E60D 47/0804; E60D 47/08; E05D 1/02; E05D 7/00; E05D 15/24; E05D 15/242; E05D 3/022; E05Y 2900/602
See application file for complete search history.

(56) References Cited

U.S. PATENT DOCUMENTS

| | | | | |
|---|---|---|---|---|
| 2,342,477 A | * | 2/1944 | Magnenat | ............ A45D 40/221 16/257 |
| 3,333,726 A | * | 8/1967 | Belanger | ............... E05D 7/1072 16/257 |

(Continued)

FOREIGN PATENT DOCUMENTS

| | | |
|---|---|---|
| DE | 102008017133 A1 | 11/2009 |
| JP | H01235619 | 9/1989 |

(Continued)

*Primary Examiner* — Chuck Mah
(74) *Attorney, Agent, or Firm* — Von Rohrscheidt Patents

(57) ABSTRACT

The invention relates to a lid which is pivotably attached by a link at a filling spout (1) of a windshield washing water container. The invention proposes to provide the link with pinions which are received in support eyelets with an intermediary space there between. During injection molding the intermediary space is filled by slides of an injection molding tool so that the lid is injection moldable in one step together with the filling spout.

8 Claims, 4 Drawing Sheets

(56) References Cited

U.S. PATENT DOCUMENTS

| | | | | |
|---|---|---|---|---|
| 3,531,823 | A * | 10/1970 | Cornelius | E05D 3/022 16/361 |
| 4,029,234 | A * | 6/1977 | Johnson, Jr. | B65D 43/164 220/840 |
| 4,609,234 | A * | 9/1986 | Naniwa | E05D 3/022 16/341 |
| 5,054,723 | A * | 10/1991 | Arnold | A61G 7/0503 128/912 |
| 5,150,806 | A * | 9/1992 | Glomski | B65F 1/1646 220/815 |
| 5,316,373 | A * | 5/1994 | Markel | A47C 7/543 16/266 |
| 6,053,458 | A * | 4/2000 | Meyer | B29C 45/0017 248/74.1 |
| 6,154,927 | A * | 12/2000 | Oi | F16C 11/10 16/342 |
| 6,599,427 | B2 * | 7/2003 | Nohren | B01D 39/2055 210/660 |
| 6,962,470 | B2 * | 11/2005 | Anscher | E05B 65/5292 411/433 |
| 7,619,789 | B2 * | 11/2009 | Kurokawa | H04N 1/00519 358/471 |
| 8,684,361 | B2 * | 4/2014 | Henson | F41J 1/01 273/389 |
| 8,756,765 | B2 * | 6/2014 | Broadhead | B29C 45/0017 16/222 |
| 8,882,072 | B2 * | 11/2014 | Hattori | B29C 45/006 248/230.1 |
| 2004/0244145 | A1 * | 12/2004 | Anscher | B29C 45/0017 16/222 |
| 2007/0102392 | A1 * | 5/2007 | Hoepner | B65D 47/0885 215/237 |
| 2008/0134466 | A1 * | 6/2008 | Massengill | E05D 5/10 16/222 |
| 2008/0263821 | A1 * | 10/2008 | Levey | E05D 9/005 16/225 |
| 2011/0214400 | A1 * | 9/2011 | Hanna | B65D 43/16 53/476 |
| 2013/0134176 | A1 * | 5/2013 | Fuglie | B65D 51/18 220/848 |

FOREIGN PATENT DOCUMENTS

| | | |
|---|---|---|
| JP | 99217729 | 8/1997 |
| JP | H1110676 | 1/1999 |
| JP | 200287218 | 10/2003 |
| JP | 4814163 | 1/2009 |
| WO | WO 0189795 A1 | 11/2001 |

* cited by examiner

LINK

RELATED APPLICATIONS

This application claims priority from European Patent application 13 004 317.7 filed on Sep. 3, 2013, which is incorporated in its entirety by this reference.

FIELD OF THE INVENTION

The invention relates to a link. The link is provided in particular for a pivotable attachment of a lid at a filling opening of a windshield washing water container of a car. The link, however, is also usable for a pivotable attachment of lids of other containers of motor vehicles or at other locations and generally for a pivotable connection of two components.

BACKGROUND OF THE INVENTION

Flexible plastic straps are typically used for attaching a lid at a filling opening of a windshield washing water container in a car wherein the straps are integrally produced with the lid in one piece and for example have a ring at an end that is remote from the lid, wherein the ring is snapped into a groove that is circumferentially arranged around the filling opening. Plastic straps have the disadvantage that they can become brittle and break over time. Low temperatures also cause a fracture risk because they reduce an elasticity of the plastic material. Also frequent opening and closing of the lid can lead to a fracture of the strap. Furthermore a plastic strap can pivot an open lid far enough over the filling opening due to the elasticity of the strap so that the lid impedes filling in windshield washing water which renders filling in the windshield washing water more difficult.

The publication document DE 10 2008 017 133 A1 discloses a filling spout of a windshield washing water container with a lid which is pivotably connected with the filling spout through a link. In order to form the link the lid includes a U shaped bracket which is arranged at a right angle on an outside of a circumference of the lid and reaches under a hook on an outside at a circumference of the filling spout. The lid and the filling spout are injection molded from plastic material as separate components and have to be assembled thereafter.

BRIEF SUMMARY OF THE INVENTION

Thus, it is an object of the invention to provide a link which pivotably connects two components at one another without having to assemble the link or the two components.

The object is achieved through a link including a pinion and a support eyelet wherein the pinion is pivotably received in the support eyelet, wherein the pinion and the support eyelet are configured as two discrete components, and wherein the pinion is cast in one step together with the support eyelet so that the pinion engages the support eyelet.

The link according to the invention includes a pinion and a support eyelet in which the pinion is pivotably received. The pinion and the support eyelet are two components which are molded in one step according to the invention, this means jointly, in particular injection molded. The pinion is molded so that it engages the support eyelet. After demolding the pinion pivotably engages the support eyelet. The pinion is not introduced or inserted into the support eyelet. Assembling the link can be omitted. It is an advantage of the invention that the link is produced and finished through molding, in particular injection molding in one step (one shot) without assembly. The link according to the invention is advantageously produced from plastic material, molding or injection molding from a different material, in particular metal, however, is possible. Producing the pinion and the support eyelet from the same material is feasible but not mandatory.

Advantageously the pinion and the support eyelet are configured and arranged so that the pinion is pivotably and inseparably received in the support eyelet. Inseparably means that the link cannot be disassembled without destroying or deforming it. The pinion cannot be moved out of the support eyelet by any movement whatsoever.

In order to provide the pivotable and inseparable connection one embodiment of the invention provides two pinions with identical axes which engage two support eyelets in opposite directions, this means away from each other or towards each other.

In some embodiments of the invention there is an intermediary space between the pinion and the support eyelet. This intermediary space which envelops the pinion in particular during molding facilitates producing the link according to the invention through molding in one step without subsequent assembly. During molding a molding tool, a core inserted into the molding tool or a slide that is movable in the molding tool fills the intermediary space which envelops the pinion in the support eyelet so that the pinion and the support eyelet can be molded in one step while still being two components, wherein the components are movable thus pivotable relative to one another without deforming the pinion, the support eyelet or any other component. In addition to pivotability the link according to the invention can have one or plural linear degrees of freedom which are advantageously limited.

An embodiment of the invention provides that the link includes a lid and an opening that can be opened and closed by pivoting the lid. In particular the opening is a filling opening of a windshield washing water container or of another container in a car which is closable by a lid. The support eyelet is provided at the opening and the pinion is provided at the lid or vice versa wherein the support eyelet and/or the pinion advantageously are integral components of the opening and/or of the lid.

An advantageous embodiment of the invention provides that the link and respective associated components are configured so that the lid can be brought into an open position from which it is not directly movable onto the opening through pivoting, this means closable. This embodiment is facilitated for example by a configuration of the link which moves the lid into the open position through a linear movement after opening the lid through pivoting, wherein the lid is not movable out of the open position through pivoting but only through a linear movement into a position in which it is movable onto the opening through pivoting. This embodiment of the invention prevents unintentional pivoting of the lid into the closed position while filling a liquid into the opening.

An embodiment of the invention provides a filter in the opening or below the opening or at least at a location that is flowed through by the liquid during filling. The filter can be for example a filter screen which is integrally molded with a spout that includes the opening. Another option is inserting a filter into a molding tool before molding.

The invention furthermore relates to an injection molding tool for producing a link as described supra. The injection molding tool includes one cavity, this means one or possibly also plural spaces with the shape of the pinion and the support eyelet to be produced including for example a lid and a filling spout of a container or of the container. According to the invention the molding tool includes two slides forming a cavity which forms the pinion during molding. The slides envelop the pinion in the cavity forming the bearing eyelet in the molding tool, so that the pinion engaging the bearing eyelet is produced by molding in one step together with the bearing eyelet with an intermediary space that is kept vacant in the molding tool by the slide wherein the intermediary space envelops the pinion in the bearing eyelet. After the molding the slides are axially pulled from the pinion and thus simultaneously pulled out of the bearing eyelet, so that the link or for example a lid and a filling spout or a container to which the lid is pivotably connected through the link can be de-molded after opening the molding tool.

BRIEF DESCRIPTION OF THE DRAWINGS

Additional features of the invention can be derived from the following description of an embodiment in combination with the patent claims and the drawing figures. The individual features can be implemented in embodiments of the invention by themselves or in combination with one another. The invention is subsequently described based on an embodiment with reference to drawing figures, wherein:

DETAILED DESCRIPTION OF THE INVENTION

Figure 1:
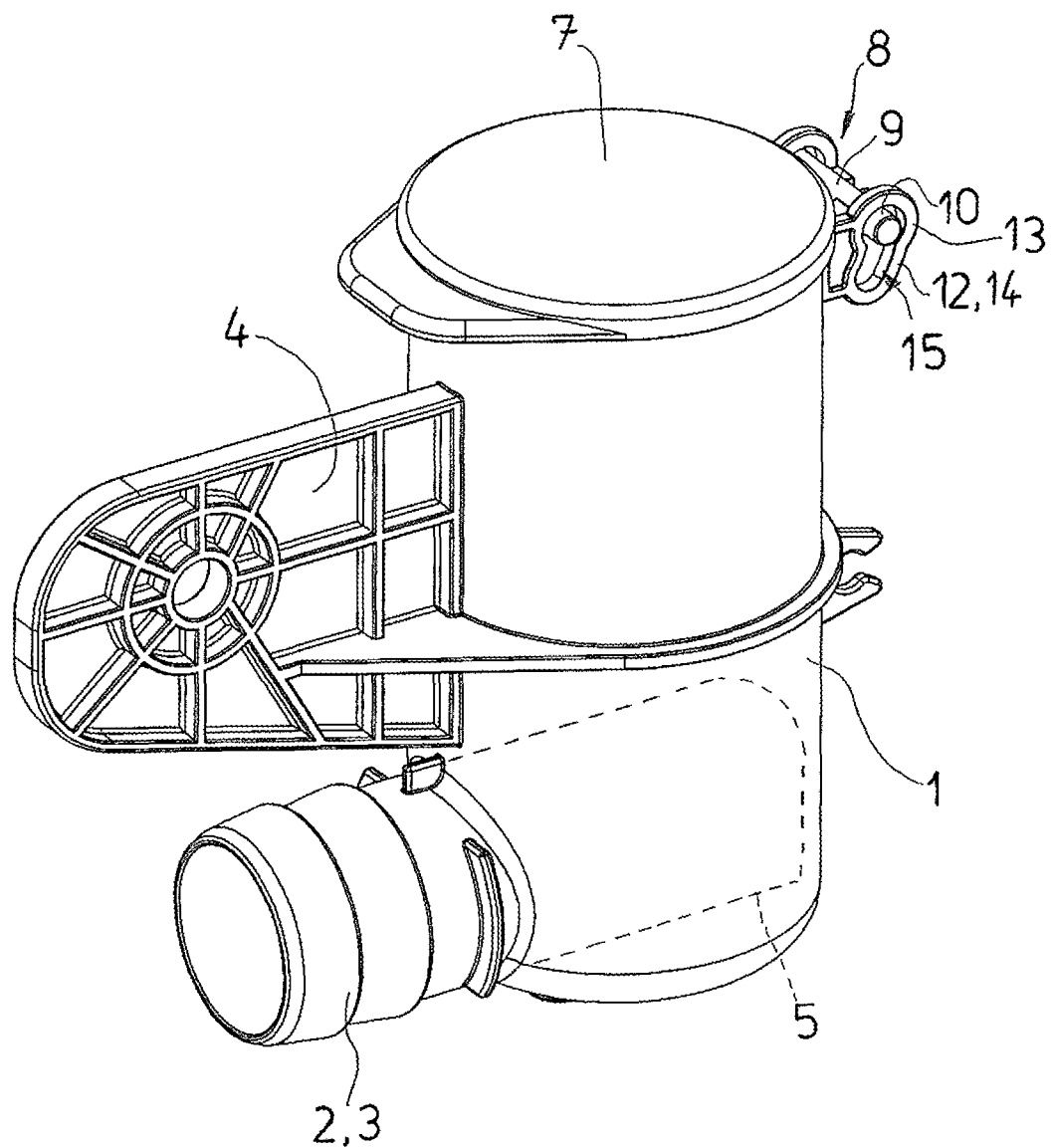
FIGS. 1 and 2 illustrate a filling spout with a link according to the invention in a perspective view with a closed lid (FIG. 1) and with an open lid (FIG. 2)

The filling spout 1 that has a tubular cylindrical shape and is illustrated in the drawing is provided for a windshield washing water container in a car which is not illustrated. The filling spout 1 is produced from plastic material through injection molding. An end that is lower in a provided installation position is closed by a base which is not visible in the drawing figures wherein the base is integrally configured in one piece with the filling spout 1.

At the lower end a hose connecting spout 2 with a Christmas tree profile 3 protrudes laterally from the filling spout 1 wherein the hose connecting spout is also integrally configured in one piece with the filling spout 1. A hose that is not illustrated is insertable onto the hose connecting spout in order to connect the filling spout 1 with the windshield washing water container.

An attachment rib 4 protrudes laterally from the filling spout 1 above the hose connecting spout 2 wherein the attachment rib is integrally configured in one piece with the filling spout 1.

A filter 5 with a U-shaped cross-section is arranged in the filling spout 1 as an extension of the hose connecting spout 2. The filter 5 penetrates the filling spout 1 transversely and its edges are connected with the base and with a circumferential wall of the filling spout 1, so that a liquid that is filled into the filling spout 1 has to flow through the filter 5 before the liquid flows into the hose connecting spout 2. The filter 5 is inserted into an injection molding tool 16 before injection molding.

Figure 2:
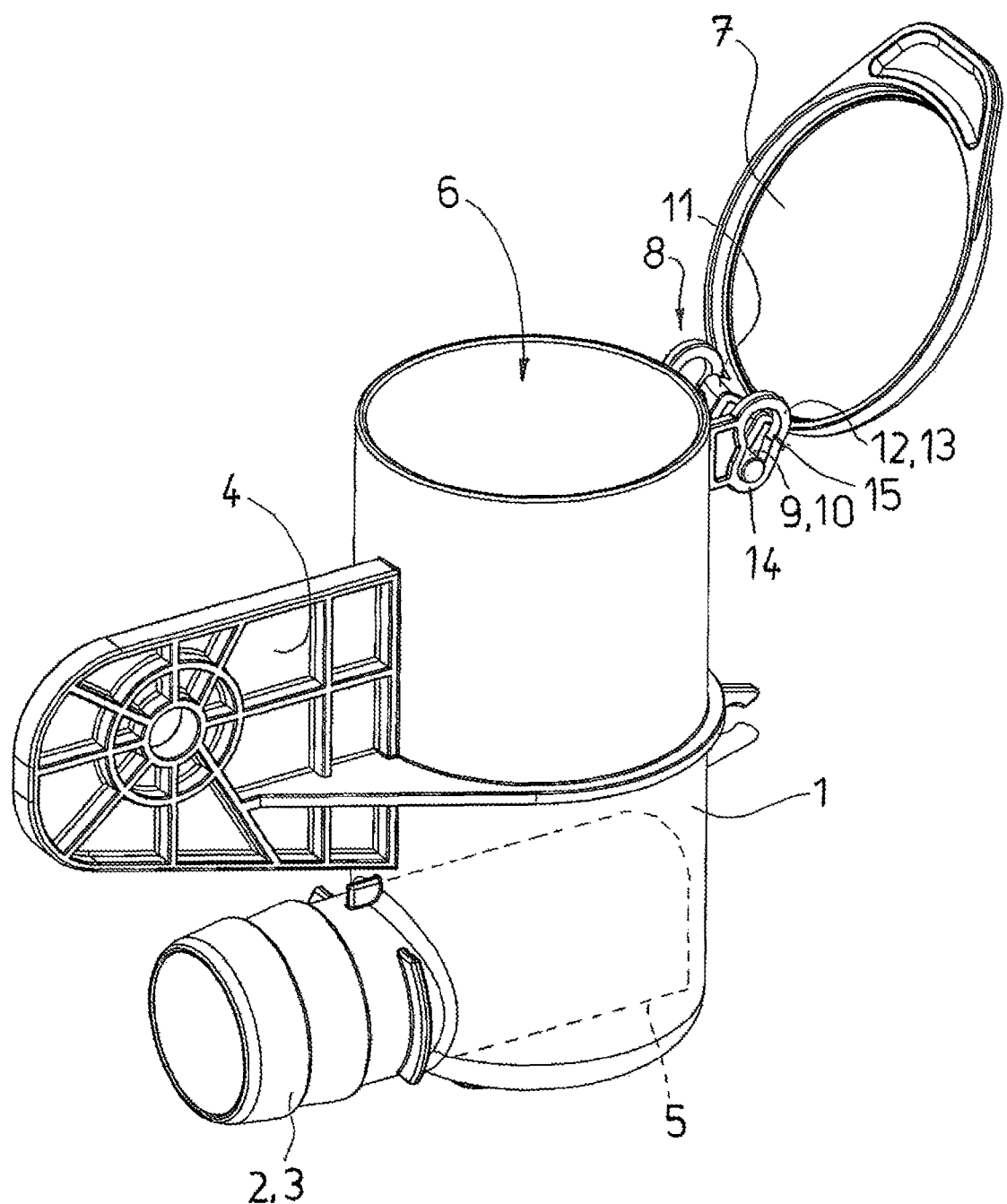

An end of the filling spout 1 that is on top in the intended installation position is open; this means the filling spout 1 includes an opening 6 that is closed with a lid 7 or closable with the lid. FIG. 1 illustrates a closed position and FIG. 2 illustrates an open position of the lid 7 in which the lid 7 is oriented laterally from the opening 6 of the filling spout 1 at a slant angle in outward/upward direction. The lid 7 is snapped onto the opening of the filling spout 1 in the closed position.

The lid 7 is pivotably connected with the filling spout 1 through a link 8 according to the invention. In order to form the link 8 the lid 7 includes a cylindrical pin whose two ends form pinions 10 with identical axes, wherein the pinions protrude in opposite directions. The cylindrical pin 9 extends parallel to an imaginary tangent of the lid 7 laterally slightly outside and below the lid 7 and the opening 6 of the filling spout 1. The cylindrical pin 9 is connected with the lid 7 through a one piece strap 11 that is bent at a right angle and integrally formed with the lid 7 in one piece.

Figure 3:
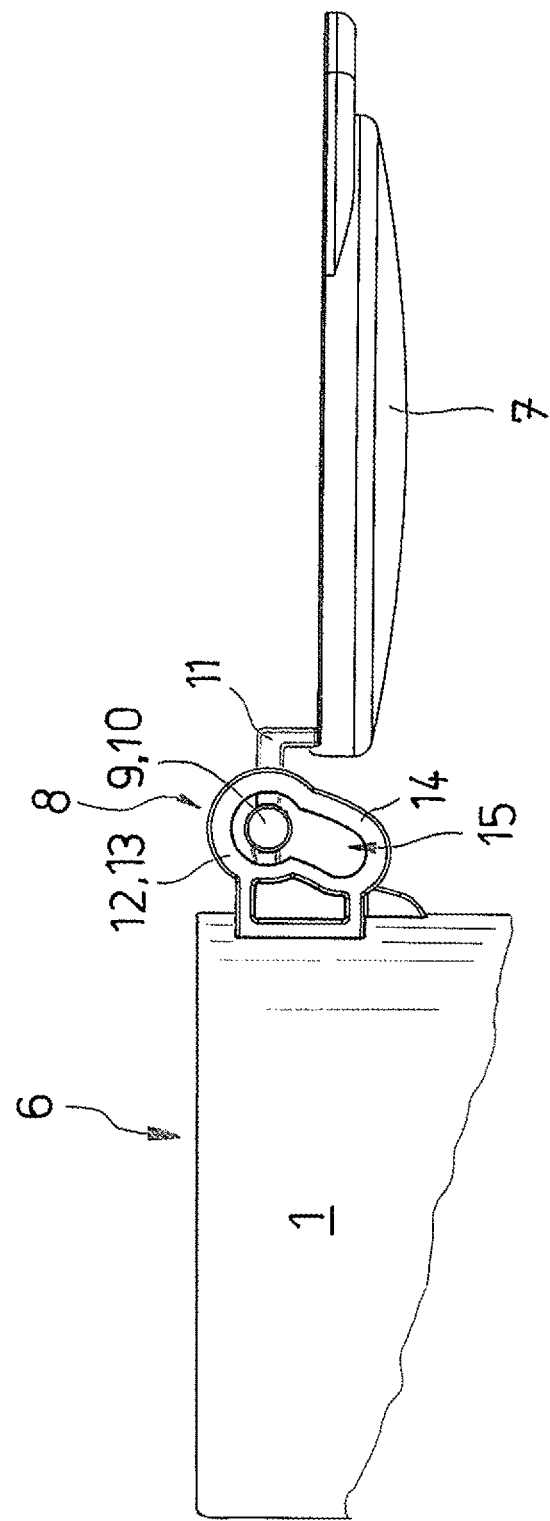
FIG. 3 illustrates the link from FIGS. 1 and 2 with the lid in an open position and molding position in an enlarged lateral view.
Figure 4:
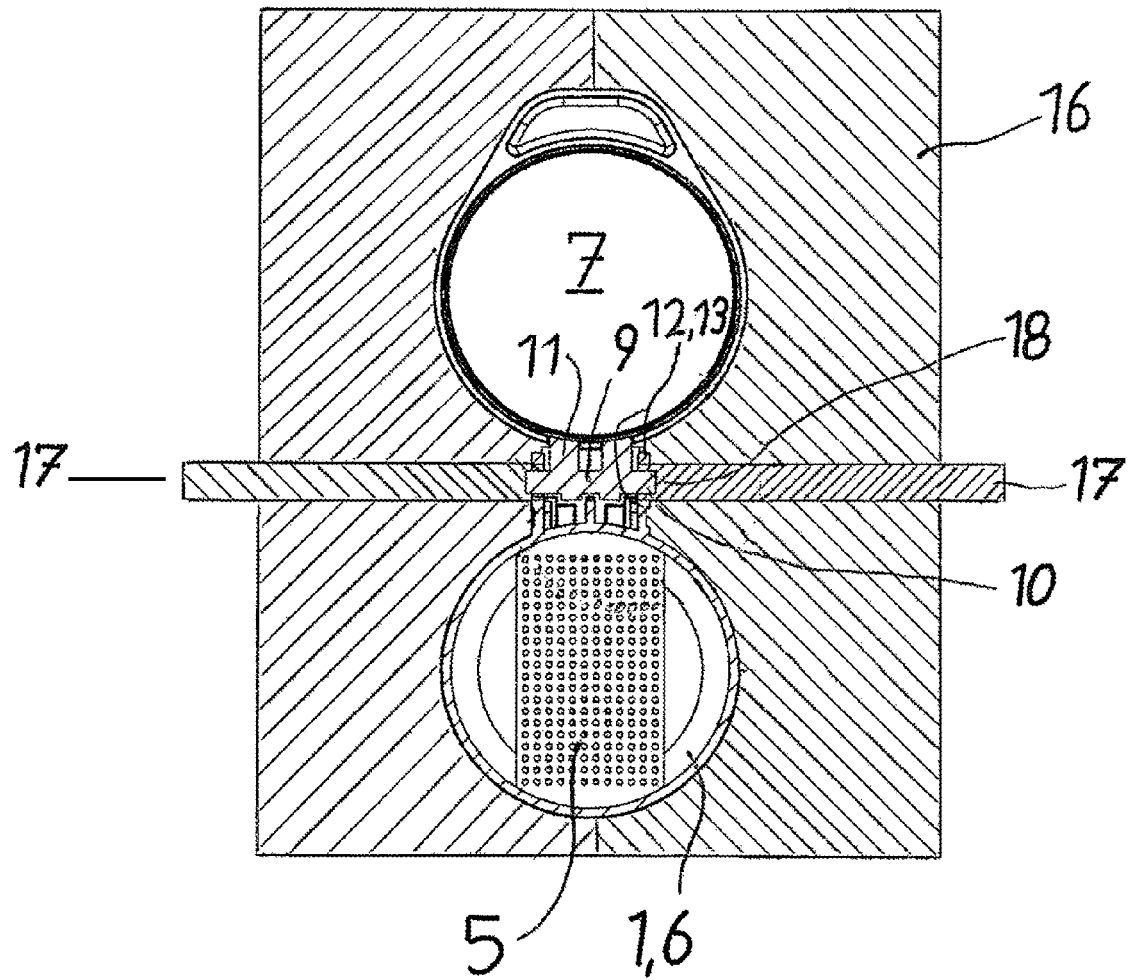
FIG. 4 illustrates the molding tool.

In order to form the link 8 the filling spout 1 includes two annular brackets 12 that are integrally connected in one piece with the filling spout at its upper end, wherein the annular brackets protrude parallel with one another and parallel to an imaginary axial plane of the filling spout 1 in outward direction from the filling spout 1. A distance of the two annular brackets 12 from one another is large enough so that the annular brackets 12 envelop the two ends of the cylindrical pin 9 which form the two pinions 10. In an upper section 13 the two annular brackets 12 are circular, in a lower section 14 they are U-shaped, so that the annular brackets 12 form key hole shaped support eyelets 15 in which the pinions 10 are received. In the U-shaped sections 14 of the annular brackets 12 the support eyelets 15 are approximately as wide as a diameter of the pinions 10. In the circular sections 13 of the annular brackets 12 a diameter of the support eyelets 15 is greater than the diameters of the pinions 10 so that the annular brackets 12 and the support eyelets 15 envelop the pinions 10 with an intermediary space there between when the pinions 10 are arranged in the circular sections 13 of the annular brackets 12 as apparent in FIGS. 1 and 3. The lid 7 can be opened and closed through pivoting when the pinions 10 are arranged in the circular sections 13 of the annular brackets 12 and as apparent in FIG. 1 the pinions 10 are arranged in the circular sections of the annular brackets 12 when the lid 7 is closed.

The link 8 that is formed by the pinions 10 and the annular brackets 12 or the support eyelets 15 connects the lid 7 pivotably with the filling spout 1. The pinions 10 and the annular brackets 12 are configured and arranged so that the pinions 10 cannot be moved out of the support eyelets 15, at least not without deforming the annular brackets 12 or another component, this means the pinions 10 are inseparably received in the support eyelets 15 and the lid 7 is permanently connected with the filling spout 1 through the link 8. When the lid 7 is open it can be moved downward in a linear manner, so that the pinions 10 move into the U-shaped sections 14 of the annular brackets 12 as illustrated in FIG. 2. In this open position the lid 7 contacts an outside of the circular sections 13 of the annular brackets 12 with an edge of the lid 7, so that the lid 7 cannot be pivoted into the closed position onto the opening 6 of the filling spout 1. This prevents unintentional closing of the lid 7 while filling windshield washing water into the filling spout 1.

The filling spout 1 is jointly produced together with the lid 7 through injection molding in one step (one-shot) in an injection molding tool 16 with two slides 17 forming a cavity 18. The lid 7 is produced in the open position illustrated in FIG. 3 into which it is pivoted from the closed position by 180° in outward direction into a radial plane relative to the filling spout 1. The two pinions 10 of the lid 7 are arranged in a center of the circular sections 13 of the annular brackets 12 so that the annular brackets 12 envelop the pinions 14 with an intermediary space. This open position of the lid 7 that is pivoted from the closed position by 180° in which position the pinions 10 are arranged in a center of the circular sections 13 of the annular brackets 12 can also be designated as a molding position. During injection molding the intermediary spaces between the pinions 10 and the annular brackets 12 are filled by two slides 17 which are movable in axial direction relative to the pinions 10 in the injection molding tool 16. These slides 17 of the injection molding tool 16 fill the support eyelets 15 during injection molding and include cavities configured as dead holes in their faces which form the pinions 10 or the cylindrical pin 9 during injection molding, wherein both ends of the cylindrical pin 9 form the pinions 10. After injection molding the slides 17 are pulled in the injection molding tool 16 axially from the pinions 10 and out of the support eyelets 15 and after pulling optional additional slides for example out of the hose connecting spout 2 and after opening the injection molding tool the filling spout 1 is de-molded together with the lid 7. The pinions 10 engage the support eyelets 15 after injection molding without assembly due to the injection molding manufacturing method according to the invention and the pinions 10 connect the lid 7 without assembly inseparably and pivotably with the filling spout The filling spout 1 can also be an integral one piece component of the windshield washing water container or of another container. The link 8 according to the invention can also be used for pivotably connecting other components besides a lid 7 with a filling spout 1.

What is claimed is:

1. A link, comprising:
   at least one pinion; and
   at least one support eyelet,
   wherein the at least one pinion is pivotably received in the at least one support eyelet,
   wherein the at least one pinion and the at least one support eyelet are configured as two discrete components, and
   wherein the at least one pinion is molded in one shot together with the at least one support eyelet so that the at least one pinion engages the at least one support eyelet,
   wherein the link includes a lid and a snout including an opening,
   wherein the lid is pivotable from a first open position where the lid opens the opening of the spout to a closed position where the lid closes the opening of the spout,
   wherein the lid is slidable from the first open position into a second open position where the lid opens the opening of the spout, and
   wherein the lid is not pivotable from the second open position to the closed position without sliding the lid into the first open position.

2. The link according to claim 1, wherein the at least one pinion and the at least one support eyelet are injection molded.

3. The link according to claim 1, wherein the at least one pinion and the at least one support eyelet are made from an identical material.

4. The link according to claim 1, wherein the at least one pinion is inseparably arranged in the at least one support eyelet.

5. The link according to claim 4,
   wherein the at least one pinion includes two pinions and the at least one support eyelet includes two support eyelets, and
   wherein the two pinions have identical axes which engage the two support eyelets in opposite directions.

6. The link according to claim 1, wherein the at least one pinion is pivotably received in the at least one support eyelet with an intermediary space arranged between the at least one pinion and the at least one support eyelet.

7. The link according to claim 1,
   wherein the link is arranged at the spout which is integrally provided in one piece with the at least one support eyelet or with the at least one pinion, and
   wherein the lid is integrally provided in one piece together with the at least one pinion when the spout is integrally provided in one piece with the at least one support eyelet, or
   wherein the lid is integrally provided in one piece together with the at least one support eyelet when the spout is integrally provided in one piece with the at least one pinion.

8. The link according to claim 1, wherein a filter is attached in the spout.

* * * * *